April 25, 1967 H. J. DIBBLEE ETAL 3,315,301
APPARATUS FOR STRETCHING SHEET MATERIAL
Filed March 18, 1964 4 Sheets-Sheet 1
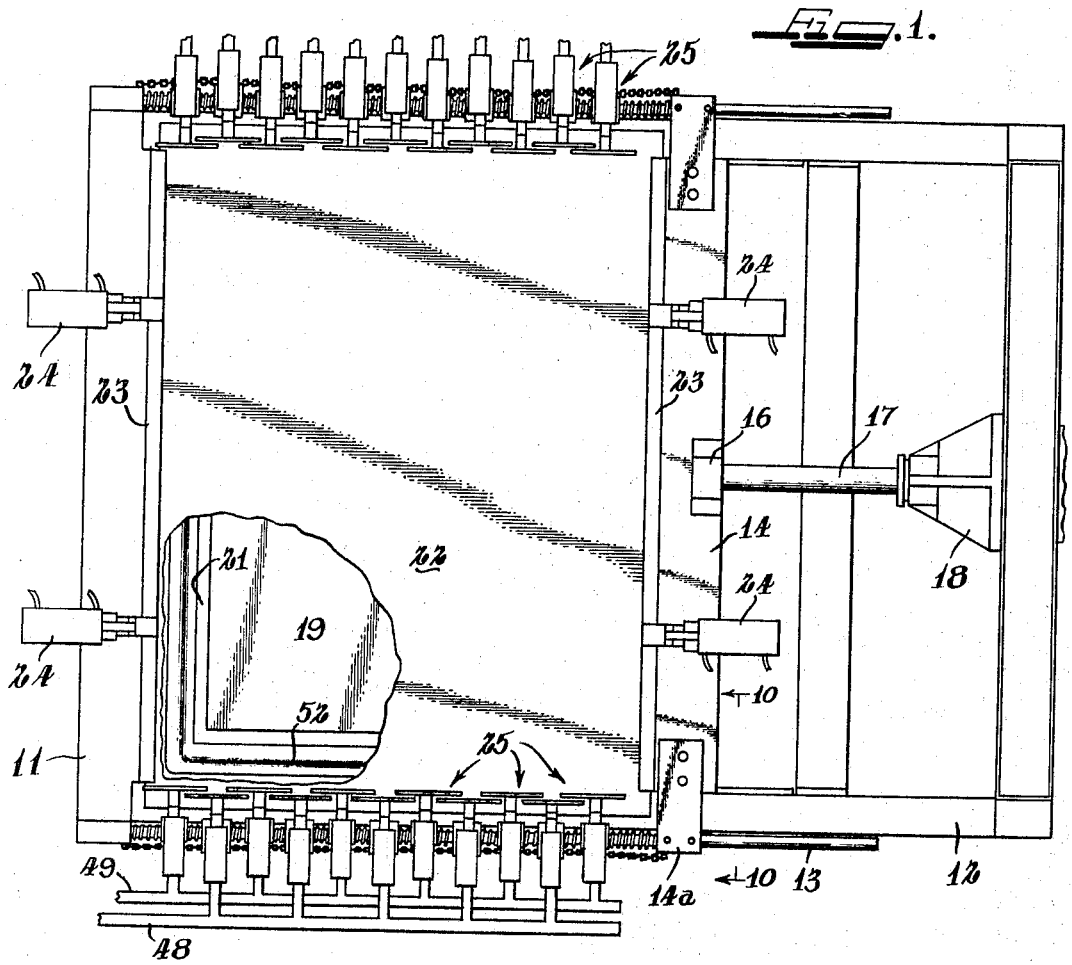
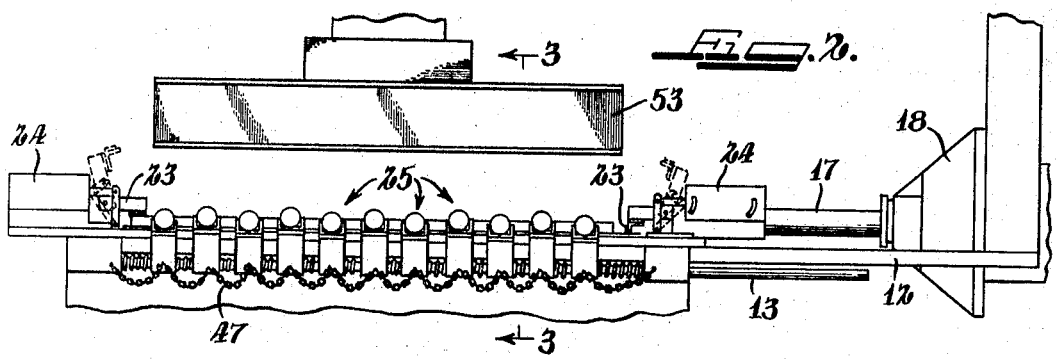
INVENTORS
HAROLD J. DIBBLEE
RICHARD V. MUHLETHALER
BY
Charles H. Redman
Atty.

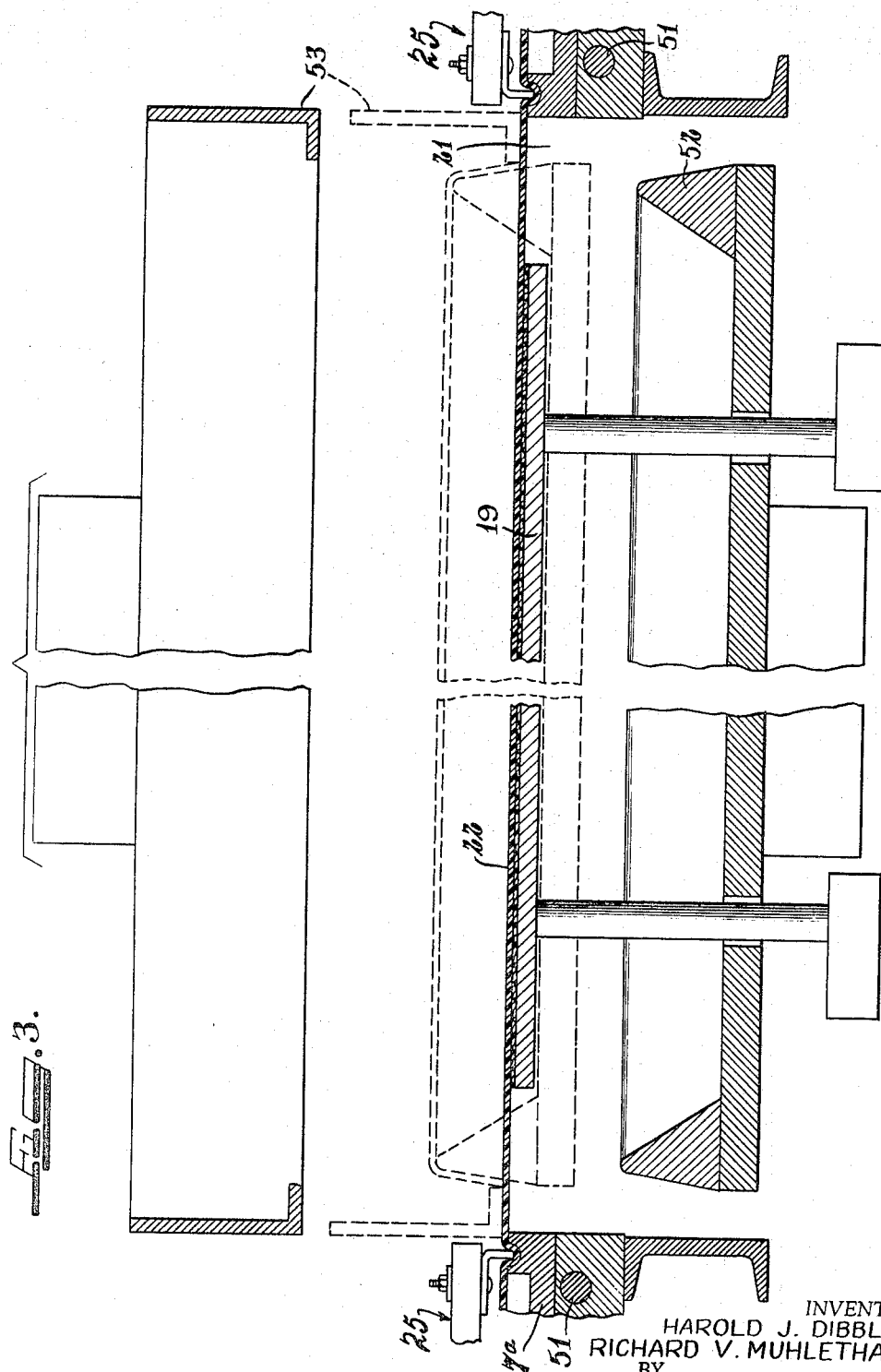

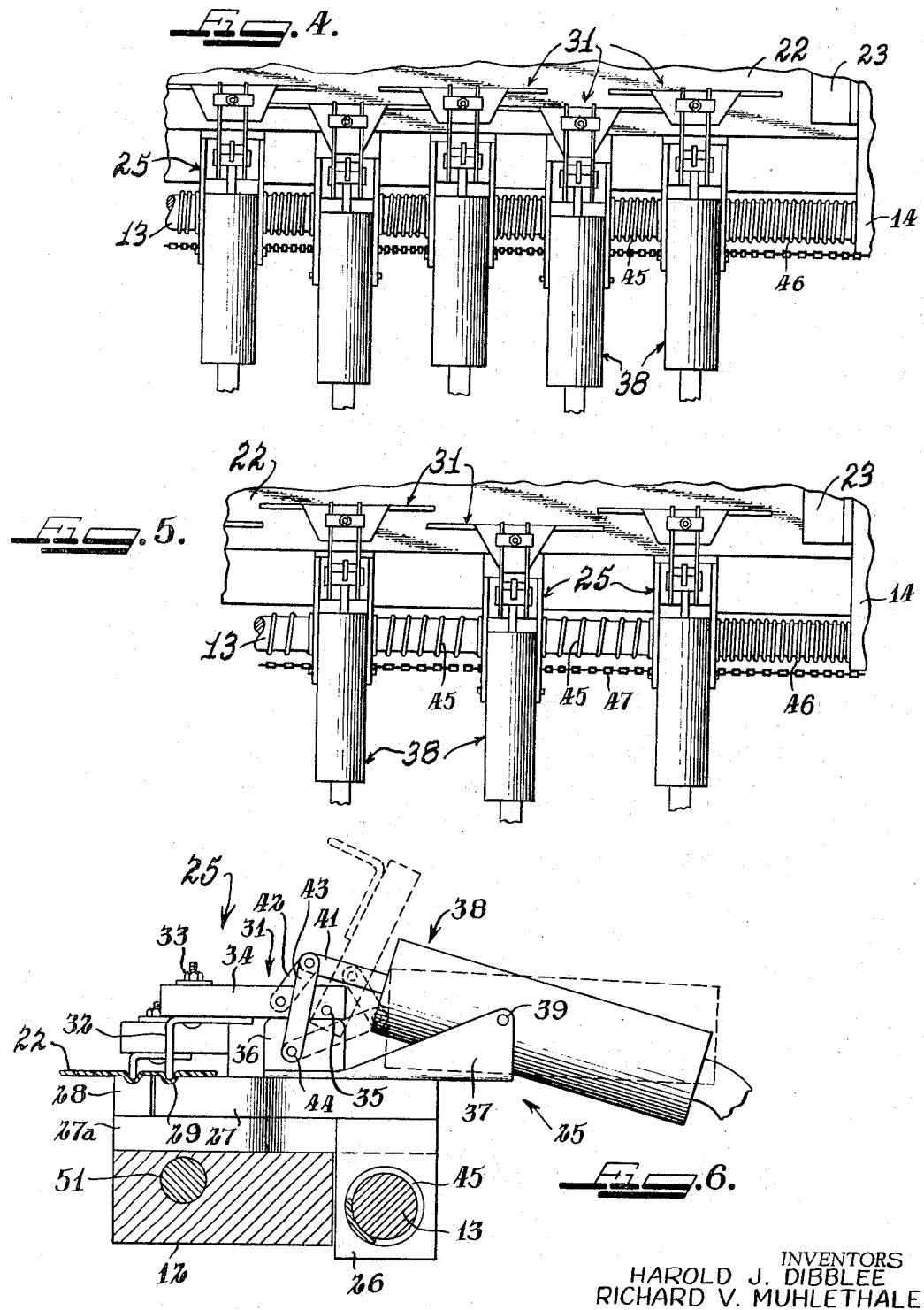

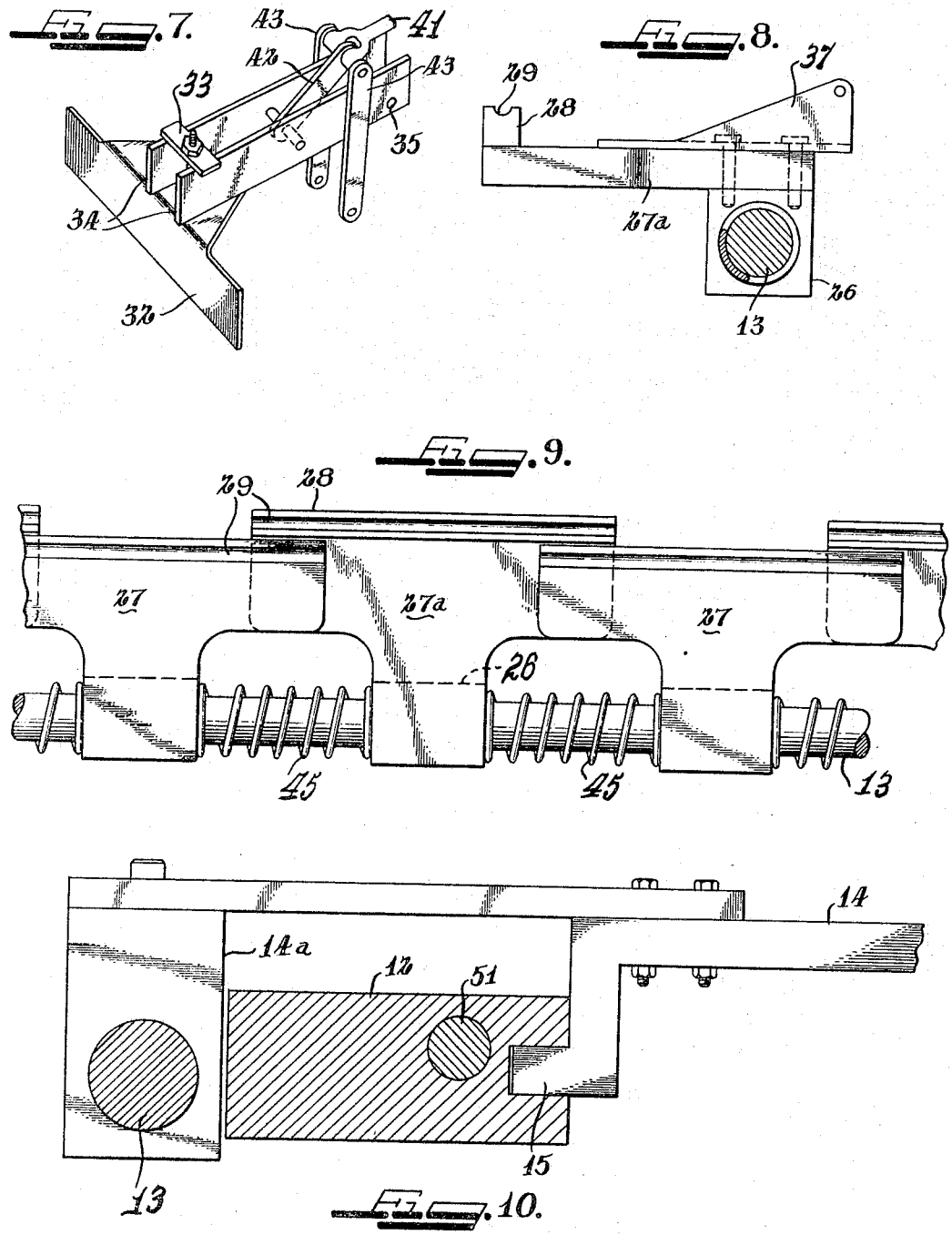

United States Patent Office 3,315,301
Patented Apr. 25, 1967

3,315,301
APPARATUS FOR STRETCHING SHEET
MATERIAL
Harold J. Dibblee, Elburn, and Richard V. Muhlethaler, Park Ridge, Ill., assignors to Arrem Plastics, Inc., Addison, Ill., a corporation of Illinois
Filed Mar. 18, 1964, Ser. No. 352,810
7 Claims. (Cl. 18—1)

This invention relates to the method of and apparatus for uniformly stretching and forming sheet material and more particularly to apparatus for drawing thick plastic sheets into thinner sheets of uniform thickness and then molding or otherwise forming them into specific shapes such as for example, light canopies.

It has been found that a thick sheet of plastic material stretched uniformily while at an elevated temperature is moldable, or otherwise formed, into a tougher article having a uniform wall thickness throughout. Such uniformity can only be accomplished when the stretching, both transversely and longitudinally, is uniform throughout the entire area of the sheet. Also, a given article can be formed from a sheet of minimum dimensions without excessive material waste. Prior attempts to stretch plastic sheets have involved end and edge clamping of the sheet. Because the edge clamps in known prior apparatus are spaced apart one from the other with a gap between them, there is a dishing or scalloping of the marginal edges of the sheet between the clamped areas with the result that the stretching is not uniform and the scalloped edge margin must be trimmed from the finished product with resultant material waste.

The present apparatus is characteried in its inclusion of banks of clamp assemblies of novel construction that are engagable with the longitudinal margins of the sheet, which clamp assemblies are in overlapping relationship at all times so as to insure that the entire longitudinal margins of the sheet are gripped and the sheet is therefore stretched uniformily throughout its areas without scalloping.

An object of the invention is to provide a novel apparatus of the character described.

Another object is to provide an apparatus for stretching a plastic sheet uniformly to insure a uniform thickness throughout its area.

Another object is to provide clamp assemblies of novel construction.

Another object is to provide a bank of movable clamp assemblies for gripping an edge of a plastic sheet and wherein the clamp assemblies are positively urged apart during the stretching of said sheet.

Another object is to provide an apparatus for stretching and forming plastic sheets with novel support means for the sheet.

Another object and still further is to provide clamp means of a kind that permit the plastic sheet to flow therebeneath during the stretching operation.

Still another object is to provide novel means to maintain the plastic sheet in a heated condition during the stretching operation.

The structure and means by which the above noted and other objects and advantages of the invention are attained will be described in the following specification, taken in conjunction with the accompanying drawings, showing a preferred illustrative embodiment of the invention, in which:

FIG. 1 is a plan view of the forming bed and clamp arrangement of the apparatus, showing a plastic sheet therein;

FIG. 2 is a side elevational view of the apparatus, showing the bank of clamp assemblies contracted;

FIG. 3 is an enlarged vertical sectional view, taken substantially on line 3—3 of FIG. 2, omitting the clamp mountings;

FIG. 4 is an enlarged plan view of a section of the bank of clamp assemblies showing them contracted;

FIG. 5 is a view similar to FIG. 4, showing the clamp assemblies in extended positions;

FIG. 6 is a side elevational view of one of the clamp assemblies, showing the mounting structure in vertical section;

FIG. 7 is a perspective view of the clamp jaw shown in FIG. 6;

FIG. 8 is a side elevational view of an intermediate clamp assembly base;

FIG. 9 is a plan view of the plates of adjacent clamp assemblies; and,

FIG. 10 is a detail sectional view taken on line 10—10 of FIG. 1.

Referring to the exemplary disclosure in the accompanying drawings, and particularly to FIGS. 1 and 3, the apparatus includes a horizontally disposed frame structure consisting of a fixed end bar 11, having extending from each end region thereof a side rail 12 and a guide rod 13, on which is slidably mounted a second end bar 14, as by end bearings 14a guided on the guide rods 13. The end bar 14 is also slidably mounted at its ends in the side rails 12, as shown in FIG. 10 at 15, and is operably connected, as at 16, with a piston rod 17 extending out of a piston-cylinder assembly 18 so as to be movable toward and away from bar 11 when hydraulic pressure is applied to the respective ends of the piston-cylinder assembly.

Arranged within the rectangular frame formed by bars 11 and 14 and side rails 12, is a floor plate or support 19 that is of a size to leave a perimeter gap 21 therearound when the bar 14 is in an extreme position.

Insofar as described, a sheet of plastic material 22 preheated and, while still in a soft state, is laid over the floor plate 19. Its perimeter edges or margins are firmly clamped, in a manner to be described in detail presently, whereupon the movable end bar 14 is moved away from bar 11 so as to stretch the sheet longitudinally. To this end each end bar 11 and 14 is provided with a bar clamp 23 movable into clamping and unclamping positions by means of piston-cylinder assemblies 24, as perhaps best illustrated in full and dotted lines in FIG. 2. It is when the clamp bars 23 are in sheet clamping positions that the piston-cylinder assembly 18 is actuated to spread the bars 11–15 and stretch the sheet longitudinally.

During such stretching, unless the sheet 22 is held firmly over the entire length of its longitudinal edges, the sheet would bow inwardly along each longitudinal edge with the result that thinning out of the sheet would be irregular. Accordingly, novel clamp assemblies 25 are provided to hold said longitudinal sheet edges firmly throughout their lengths. These clamp assemblies are arranged in banks, one bank on each guide rod 13. As best shown in FIG. 4, the clamp assemblies are closely spaced when the sheet is initially inserted and clamped. When the sheet is being stretched, the clamp assemblies 25 move apart a total distance corresponding substantially to the amount of stretching. This is illustrated in FIG. 5.

Referring now to FIG. 6 in particular, each clamp assembly 25 includes a bearing block 26 that is freely slidable on the guide rod 13. Since these are substantially identical in structure and operation, only one will be described in detail and like numbers will identify corresponding parts of each. Any differences will be specifically pointed out.

As shown, each block 26 has firmly mounted on its upper face a T-shaped plate 27–27a (FIG. 9) that extends toward and overlies the gap 21. Each alternate plate 27a of the bank of plates is offset below the intermediate plate 27 so that they can overlap at their opposed ends when the clamps are in the contracted positions as shown in FIG. 4 and when in their fully spread apart positions they are as shown in FIG. 5. The intermediate plate assembly is shown in detail in FIG. 6 whereas the alternate plate assembly is shown in FIG. 8. It is to be noted that the plate 27a has a rail 28 on its edge and that said rail and the free edge of plate 27 each have a longitudinal groove 29 formed on its top surface. This constitutes the only material difference between the adjacent clamp assemblies. The longitudinal margins of the plastic sheet 22 lie over the grooves 29 and a clamp jaw assembly 31 is adapted to engage over the sheet to clamp it in said grooves as shown in FIG. 6.

The clamp jaw assembly 31 is comprised of a vertical plate 32 secured at 33 to the underside of a pair of rigidly connected arms 34 that are pivoted at their other end, as at 35, to a bracket boss 36. The boss is carried by a wing bracket 37 that extends clear of the bearing block and in which is pivotally mounted a piston-cylinder assembly 38, as at 39. The piston rod 41 thereof is connected to two sets of links 42 and 43, the former being pivotally connected to arms 34 and the latter connected pivotally, as at 44, to the bracket boss 36. The vertical plate 32 of each clamp assembly is of sufficient length that when adjacent clamp assemblies are spaced their greatest distance apart, as shown in FIG. 5, their ends overlap. This insures that at no time is any portion of the engaged edges of the sheet free of a clamp during stretching.

Referring to FIGS. 4 and 5, the clamp assemblies are each separated by a coil spring 45 mounted on guide rod 13, and a like spring 46 is arranged between end bar 14 and the adjacent clamp plate assembly. When the end bar 14 is in its fully retracted position the clamp assemblies are closely spaced as shown in FIG. 4. As the end bar 15 is drawn outwardly to stretch the sheet, the springs 45 progressively urge the clamp assemblies apart uniformly and in unison with the stretching, and their spreading is limited by flexible chains 47 extending between them.

In this manner the longitudinal edges of the sheet are securely clamped throughout their lengths and there is uniform stretching without edge bowing, undulations or scalloping.

The piston-cylinder assemblies on the intermediate clamp assemblies are connected to a common conduit 48 connected with a source of hydraulic pressure whereas the piston-cylinder assemblies on the alternate clamp assemblies are connected to a second common conduit 49 connected with the source of hydraulic pressure. This affords means whereby the alternate clamp assemblies may be moved in unison into clamping position followed by the intermediate or upper clamp assemblies and vice-versa. The clamping effected by the clamp assemblies is such that the material can flow under the clamp jaws in a longitudinal direction during stretching.

In order to maintain the sheet in a heated condition during the stretching, an electrical heating element 51 is embedded in each side rail 12.

Forming of the sheet while it is in stretched condition is accomplished by bringing a die 52 (FIG. 3) up through the gap 21 while a pressure ring 53 is brought down onto the sheet margins inwardly of the clamp assemblies.

Although we have described a preferred embodiment of the invention in considerable detail, it will be understood that the description thereof is intended to be illustrative, rather than restrictive, as many details of the structure disclosed may be modified or changed and the steps of the method may vary, without departing from the spirit or scope of the invention. Accordingly, we do not desire to be restricted to the exact construction method and means described.

What we claim and desire to secure by Letters Patent of the United States is:

1. In apparatus for stretching a rectangular sheet, the combination of, a rectangular frame consisting of parallel side bars and parallel end bars, guide rods paralleling said side bars, a clamp device carried by each end bar and adapted to grip the end margins of said sheet, means operable to move the end bars away from one another to stretch said sheet, a bank of clamp assemblies carried on each guide rod and adapted to grip the longitudinal edges of said sheet, each said bank of clamp assemblies comprising a plurality of separate clamp assemblies of such dimensions that each clamp assembly overlaps an adjacent clamp assembly, and means for normally urging the clamp assemblies in each bank toward one another, and means to impart movement to said clamp assemblies away from each other in response to stretching movement of said sheet.

2. In apparatus for stretching a rectangular sheet the combination of, a rectangular frame including parallel side bars and parallel end bars, guide rods extending between said end bars, a clamp device carried by each end bar and adapted to grip the end margins of said sheet, means operable to move the end bars away from one another to stretch said sheet, a bank of clamp assemblies carried on each guide rod and adapted to grip the longitudinal edges of said sheet, each said bank of clamp assemblies comprising a plurality of separate clamp assemblies of such dimensions that each clamp assembly overlaps an adjacent clamp assembly, the clamp assemblies in each bank being normally spaced closely one to the other, and spring means to impart movement to said clamp assemblies away from each other in response to stretching movement of the sheet.

3. In apparatus for stretching a rectangular sheet, the combination of, a rectangular frame including parallel guide rails and parallel end bars, a clamp device carried by each end bar and adapted to grip the end margins of said sheet, means operable to move the end bars away from one another to stretch said sheet, a bank of clamp assemblies carried on each guide rail and adapted to grip the longitudinal edges of said sheet, each of said bank of clamp assemblies comprising a plurality of separate clamp assemblies of such dimensions that each clamp assembly overlaps an adjacent clamp assembly, and spring means to impart movement to said clamp assemblies away from each other in response to stretching movement of the sheet.

4. In apparatus for stretching a heat softened rectangular sheet, the combination of, a rectangular frame consisting of parallel side bars and parallel end bars, guide rods paralleling said side bars, a clamp device carried by each end bar and adapted to grip the end margins of said sheet, means to heat said sheet to maintain it soft, means operable to move the end bars away from one another to stretch said sheet, a bank of clamp assemblies carried on each guide rod and adapted to grip the longitudinal edges of said sheet, each of said bank of clamp assemblies comprising a plurality of separate clamp assemblies of such dimensions that each clamp assembly overlaps an adjacent clamp assembly, means for normally urging the clamp assemblies in each bank toward one another, and means for imparting movement to said clamp assemblies away from each other in response to stretching movement of the end bars.

5. In apparatus for stretching a rectangular sheet, the combination of, a frame including spaced end bars, parallel guide elements extending between said end bars, clamp means carried by each end bar and adapted to grip end margins of said sheet, means operable to move the end bars away from one another to stretch said sheet, a bank of clamp assemblies carried on each guide element and adapted to grip the longitudinal edges of said sheet, each said bank of clamp assemblies comprising a plurality of separate clamp elements of such dimensions that each clamp element overlaps an adjacent clamp element, the clamp elements in each bank being normally spaced closely one to the other, and means to impart movement to said clamp elements away from each other in response to stretching movement of the sheet.

6. In apparatus for stretching a rectangular sheet of plastic material, the combination of, means for stretching the sheet in a longitudinal direction, guide elements parallel with the longitudinal edges of said sheet, a bank of clamp assemblies carried on each guide element and adapted to grip the longitudinal edges of the sheet, each said bank of clamp assemblies comprising a plurality of separate clamp elements of such dimensions that each clamp element overlaps an adjacent clamp element, the clamp elements in each bank being normally spaced closely one to the other, and means to impart movement to said clamp elements away from each other in response to stretching movement of the sheet.

7. In apparatus for stretching a sheet of plastic material having longitudinal edges, the combination of, means for stretching the sheet in a longitudinal direction, guide elements parallel with the longitudinal edges of said sheet, a bank of clamp assemblies carried on each guide element and adapted to grip the longitudinal edges of the sheet, each said bank of clamp assemblies comprising a plurality of separate clamp elements of such dimensions that each clamp element overlaps an adjacent clamp element, the clamp elements in each bank being normally spaced closely one to the other and being movable away from each other in response to stretching movement of the sheet.

References Cited by the Examiner

UNITED STATES PATENTS

| | | | |
|---|---|---|---|
| 2,702,411 | 2/1955 | Winstead | 18—19 |
| 2,759,217 | 8/1956 | Peterson | 18—1 |
| 2,856,634 | 10/1958 | Ames | 264—292 |
| 3,025,566 | 3/1962 | Kostur | 18—19 |
| 3,120,688 | 2/1964 | Nash | 26—62 |

WILLIAM J. STEPHENSON, *Primary Examiner.*